April 15, 1930.  L. S. GORDON  1,754,356
CAMERA
Filed March 16, 1928  2 Sheets-Sheet 2
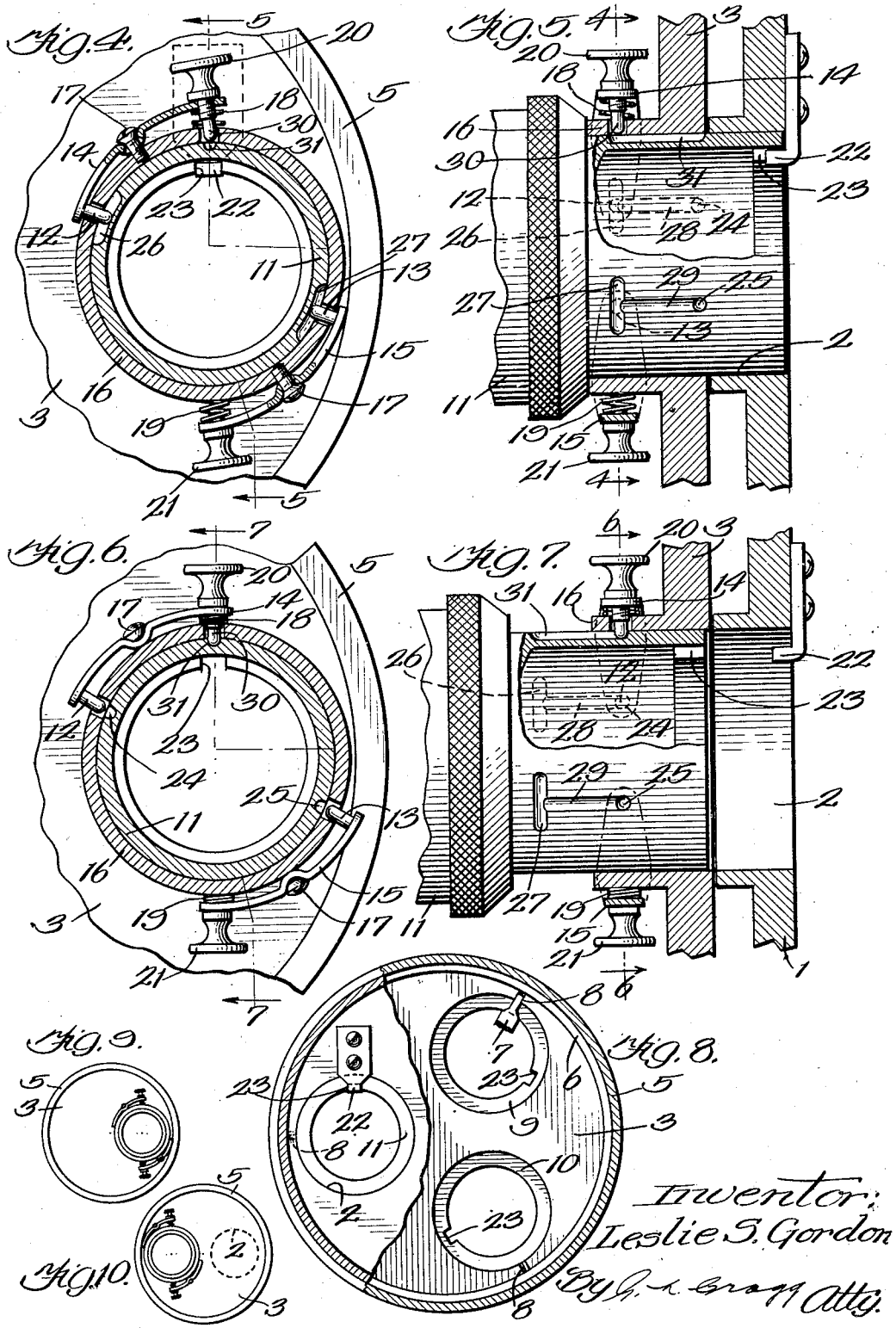
Inventor:
Leslie S. Gordon Patented Apr. 15, 1930

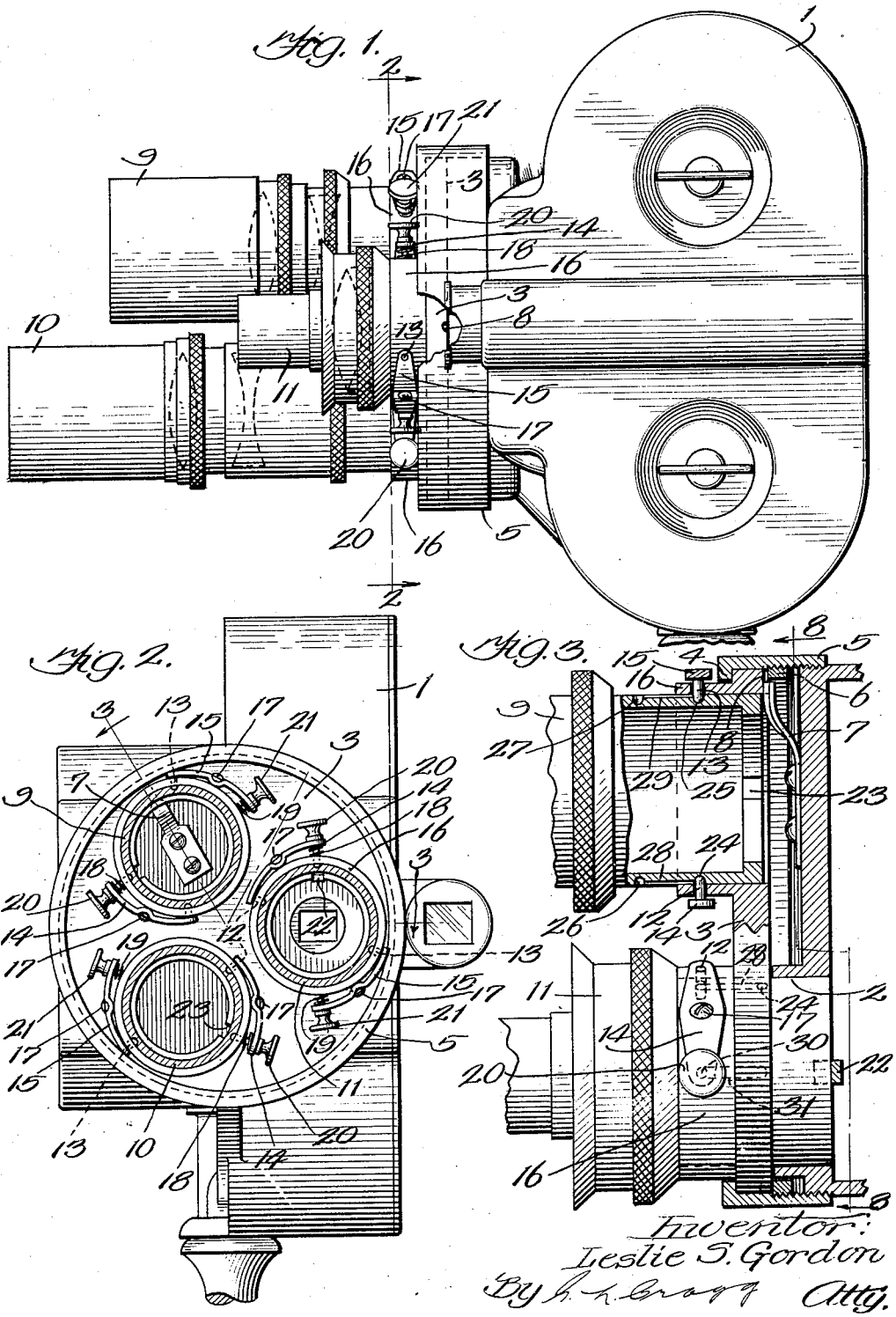

1,754,356

UNITED STATES PATENT OFFICE

LESLIE S. GORDON, OF CHICAGO, ILLINOIS

CAMERA

Application filed March 16, 1928. Serial No. 262,090.

My invention relates to cameras in which the lens tubes are adjustable with respect to the camera chambers for the purpose of bringing these tubes into and out of register with light transmitting openings that are provided in the chambers in register with the sensitized plates or films contained within the chambers.

My invention is of particular service in connection with a camera employing a plurality of lens tubes containing lens structures of differing focal lengths, though the invention is not to be thus restricted. My invention has for its object the provision of improved means for accurately locating the lens tubes when they are being placed in functioning positions and also the provision of means for avoiding undue wear of said locating mechanism. A camera in which my invention is embodied employs a mounting for the lens tube or each of the lens tubes, this mounting being assembled with the camera chamber and adjustable with respect thereto to bring said lens tube of tubes into and out of register with the light transmitting opening that is provided in the chamber. This mounting is preferably a rotatable mounting, such, for example, as is found in a turret camera, though the invention is not to be thus limited. When the mounting is adjusted to bring a lens tube thereon into register with the light transmitting opening in the camera chamber, such tube is adjustable along its axis and with respect to said chamber to bring the lens structure therein into proper focal relation with the sensitized plate or film within the chamber. Usually the lens tube has its rear end inserted within the light transmitting opening in the camera chamber when the lens structure in such tube is to be brought into proper focal relation with the interior of the camera, there being very snug sliding fit between the lens tube and the surrounding wall of the light transmitting opening to prevent improper leakage of light into the camera.

In carrying out my invention, I employ a justifying pin which is suitably carried upon the lens tube mounting, this pin being insertible within a socket that is formed in the lens tube and positioned to cooperate with the pin to hold the tube in that one of its alternative positions in which the lens structure is located to function, the innermost position of the tube in the preferred embodiment of the invention. I also provide a pin which preferably serves the double function of a guiding pin and a stop pin, this latter pin being also carried by the lens tube mounting. This latter pin is engageable with one or the other of two abutments provided upon the lens tube when this tube is in one or the other of its alternative positions in which the justifying pin is in register either with the aforesaid socket or another socket that is also provided in the tube and holds the tube in non-function position. When the aforesaid pin which cooperates with the abutment, as stated, also serves as a guiding pin, it is insertible within a groove that is formed in and along the lens tube and of sufficient length to receive the guiding pin while the lens tube is being moved between its alternative positions. I also provide a coupling which unites the pins and constrains the justifying pin to a withdrawn position when the stop or guiding pin is in register with the aforesaid abutments and is within the aforesaid groove. This coupling is desirably in the form of an intermediately pivoted arm upon whose ends the two pins are carried, this arm being preferably spring pressed in a direction to hold the justifying pin in position and the stop or guiding pin out of the groove and out of alignment with its cooperating abutments, thumb pressing being required upon the arm to bring the justifying pin out of its engaging socket and to place the guiding or stop pin in its cooperating groove and in alignment with its abutments. In the preferred embodiment of the invention, the ends of the groove that is adapted to receive the guiding pin are also the abutments for this pin.

The invention has other characteristics and will be fully set forth in connection with the accompanying drawings in which Fig. 1 is a side view illustrating one form of camera to which my invention has been applied; Fig. 2 is a sectional view on line 2—2 of Fig.

1; Fig. 3 is a sectional view on line 3—3 of Fig. 2; Fig. 4 is sectional view on line 4—4 of Fig. 5; Fig. 5 is a sectional view on line 5—5 of Fig. 4; Fig. 6 is a sectional view on line 6—6 of Fig. 7; Fig. 7 is a sectional view on line 7—7 of Fig. 6; Fig. 8 is a sectional view on line 8—8 of Fig. 3, on a smaller scale; Fig. 9 is a view, somewhat diagrammatic, illustrating another embodiment of the invention with the lens tube in register with the light transmitting opening in the camera chamber; and Fig. 10 is a view similar to Fig. 9 but showing the lens tube positioned out of register with the light transmitting opening in the camera chamber.

The camera illustrated includes a chamber 1 which contains winding and supply reels and a film which is wound about the winding reel as it is withdrawn from the supply reel. Cameras of the type illustrated may also be provided with mechanism whereby the reels may be caused to travel step by step to take so-called moving pictures. The front wall of the camera chamber is desirably circular and contains a circular or cylindrical light transmitting opening 2 which is located between the center of said chamber wall and the periphery thereof. A disc 3 has its periphery snugly received between the insetting annular shoulder 4 of an assembling ring 5 and a retaining ring 6 which is screwed within the ring 5 close to said disc, there being sufficient room, however, between the ring 6 and shoulder 4 to permit the disc 3 to be turned. The ring 5 is screwed upon the circular wall of the camera chamber, Fig. 3, after this ring has been assembled with the disc 3 as described. One or more leaf springs 7 are mounted upon the front wall of the camera chamber and are receivable, at their unmounted ends, within notches 8 formed in the rear side of the disc 3 whereby said disc may be normally held from turning. Said disc constitutes a mounting for a number of lens tubes, there being three lens tubes 9, 10 and 11 in the camera shown. These lens tubes contain lens structures of differing focal lengths and are distributed in a circular row about the center or axis of the aforesaid mounting disc, the centers of the lens tubes being in a circle that is concentric with the disc and intersecting the axis of the cylindrical light transmitting opening 2, the external diameters of the tubes and the diameter of said opening 2 being so closely approximated that any of the tubes is adapted to have very close sliding fit within the opening when such tube is brought into register with the opening by suitable turning movement of the aforesaid mounting disc. The notch or notches 8 and the corresponding spring or springs 7 are so related as to hold the disc 3 in each of the three positions to which it may be turned to bring the three lens tubes successively or selectively into register with the light transmitting opening.

Each of the lens tubes and the portions of the mounting 3 respectively contiguous thereto are equipped with the structure of my invention, a description of one such structure being applicable to each of the three structures that are shown. Two justifying pins 12 and 13 are provided in conjunction with each lens tube, these pins being mounted respectively upon ends of intermediately pivoted rocking arms 14 and 15. These rocking arms are assembled with the cylindrical extensions 16 of the mounting 3 by fulcrum screws 17, the holes in the arms through which these screws pass being suitably flared to permit the rocking movement of the arms. The ends of said rocking arms, opposite the ends where the justifying pins are carried, are provided with springs 18 and 19 which are interposed between these arm ends and the adjacent lens tube and serve to press the pins 12 and 13 inwardly or toward the corresponding lens tube in order that these pins may be normally in holding relation to the tube. When such pins are to be withdrawn from holding relation with the tube, the ends of the arms where the springs 18, 19 are provided are pressed inwardly or toward the lens tube, buttons 20 and 21 being respectively provided upon the arms 14 and 15 for convenience, these buttons desirably having shanks which are threaded into said arms and which extend into the bores of the corresponding springs to hold these springs in assembly. As hitherto stated, each lens tube is adjustable along its axis and when it is in register with the light transmitting opening 2, its axis is coincident with the axis of this opening, the tube being snugly slidable within the opening to prevent the leakage of light between it and the front wall of the camera chamber. When the lens tube is in its innermost and functioning position, a finger 22 carried by the front wall of the camera chamber has its unmounted and angular end received within a notch 23 in said tube whereby such tube is prevented from being turned upon its own axis when in functioning position. Circular sockets 24 and 25 receive the inner ends of the pins 12 and 13 when the corresponding tube is in its outermost position whereby such tube is prevented from becoming disassembled with its mounting. Sockets 26, 27 are provided in each tube in which the justifying pins are snugly received when the corresponding tube is within the light transmitting opening 2 and the finger 22 is within the notch 23. Grooves 28, 29 respectively join the sockets 26, 24 and 27, 25 in which grooves the justifying pins are received while the buttons 20, 21 are depressed and the selected tube is being moved longitudinally, the justifying pins, however, being out of contact with the tube when the tube is being moved from either of its alternative positions to the other so that the pins will not become worn and may be retained in exact size to have proper justifying fit with and within the corresponding sockets 26, 27. In case the finger 22 should happen not to be positioned with exactitude, I continue the sockets 26 and 27, transversely so that the justifying pins may be a little out of line with the grooves 28, 29 respectively when the finger 22 is within the corresponding notch 23, the continued portions of the sockets continuing to have, however, accurate engagement with the justifying pins to hold the corresponding lens tube in exactly the position it should occupy when the lens structure therein is functioning.

In order that each lens tube may be accurately guided in its movement between its alternative positions, I provide a third pin 30 which is preferably a continuation of the stem of the button 20. This third pin is normally held outside of the circle of the corresponding lens tube by the corresponding spring 18. When buttons 20 and 21 are depressed to remove the justifying pins 12 and 13 out of holding engagement with the corresponding lens tube, the third pin 30 is projected into the circle of the corresponding tube and enters a longitudinal groove 31 formed in the tube, this groove in cooperation with the third pin accurately guiding the tube in its longitudinal movement, such third pin, therefore, being a guide pin. Each end of the groove 31 constitutes an abutment. The abutment at the inner end of said groove is accurately positioned so that when it engages the third pin 30, the buttons 20 and 21 may be released with the consequence that the pins 12 and 13 are received within the sockets 24 and 25 to hold the corresponding lens tube in its outermost position. The abutment at the outer end of said groove is accurately positioned so that when it engages the third pin 30, the buttons 20 and 21 may be released with the consequence that the pins 12 and 13 are snugly received within the sockets 24 and 25 to hold the corresponding lens tube accurately in its innermost position in which the lens structure therein is adapted to function. The pin 30, when thus cooperating with the abutments at the ends of the groove 31, serves as a stop pin and in performing this function, the invention is not to be limited to the presence of the groove 31.

Changes may be made without departing from the invention.

Having thus described my invention, I claim:

1. In a camera the combination with the chamber thereof having a light transmitting opening; of a lens tube; a mounting for the lens tube assembled with said chamber and adjustable with respect to said chamber to bring said lens tube into and out of register with said light transmitting opening and with respect to which mounting said lens tube is adjustable along the lens tube axis into alternative positions toward and from the chamber; a justifying pin carried by said mounting and insertible within a socket that is formed in the lens tube and positioned to cooperate with said pin to hold said tube in one of its aforesaid alternative positions; a guiding pin also carried by said mounting and insertible within a groove that is formed in and along the lens tube and of sufficient length to receive the guiding pin while the lens tube is being moved between its aforesaid alternative positions; and a coupling uniting said pins and constraining the justifying pin to a withdrawn position when the guiding pin is witnn the aforesaid groove.

2. The structure of claim 1 wherein the groove terminates in an abutment which is positioned to engage the guiding pin when the justifying pin is in register with the aforesaid socket.

3. In a camera the combination with the chamber thereof having a light transmitting opening; of a lens tube; a mounting for the lens tube assembled with said chamber and adjustable with respect to said chamber to bring said lens tube into and out of register with said light transmitting opening and with respect to which mounting said lens tube is adjustable along the lens tube axis into alternative positions toward and from the chamber; a justifying pin carried by said mounting and insertible within a socket that is formed in the lens tube and positioned to cooperate with said pin to hold said tube in one of its aforesaid alternative positions; a stop pin also carried by said mounting and engageable with an abutment, suitably positioned upon said tube, when this tube is in that one of its alternative positions in which the justifying pin is in register with said socket; and a coupling uniting said pins and constraining the justifying pin to a withdrawn position when the stop pin is out of register with said abutment.

4. The structure of claim 1 wherein the lens tube has a second socket in which the justifying pin is receivable when the lens tube is in the other of its alternative positions.

5. The structure of claim 1 wherein the groove terminates in an abutment which is positioned to engage the guiding pin when the justifying pin is in register with the aforesaid socket and wherein the lens tube has a second socket in which the justifying pin is receivable when the lens tube is in the other of its alternative positions.

6. The structure of claim 3 wherein the lens tube has a second socket in which the justifying pin is receivable when the lens tube is in the other of its alternative positions.

7. The structure of claim 1 wherein the lens tube has a second socket in which the justifying pin is receivable when the lens tube is in the other of its alternative positions and wherein a groove is formed in the tube and terminates in the justifying pin receiving sockets.

8. The structure of claim 1 wherein the groove terminates in an abutment which is positioned to engage the guiding pin when the justifying pin is in register with the aforesaid socket and wherein the lens tube has a second socket in which the justifying pin is receivable when the lens tube is in the other of its alternative positions and wherein a groove is formed in the tube and terminates in the justifying pin receiving sockets.

9. The structure of claim 3 wherein the lens tube has a second socket in which the justifying pin is receivable when the lens tube is in the other of its alternative positions and in which a groove is formed in the tube and terminates in the justifying pin receiving sockets.

10. The structure of claim 1 wherein the camera chamber and lens tube are provided with interengaging formations which are engageable when the justifying pin functions to hold the lens tube from longitudinal movement when in one of its alternative positions, the socket then receiving the justifying pin being continued transversely of the tube to enable said formations to be readily engageable.

11. The structure of claim 3 wherein the camera chamber and lens tube are provided with interengaging formations which are engageable when the justifying pin functions to hold the lens tube from longitudinal movement when in one of its alternative positions, the socket then receiving the justifying pin being continued transversely of the tube to enable said formations to be readily engageable.

12. The structure of claim 1 wherein a spring is employed which operates upon the coupling to normally maintain the justifying pin in functioning position and the other pin out of functioning position.

13. The structure of claim 3 wherein a spring is employed which operates upon the coupling to normally maintain the justifying pin in functioning position and the other pin out of functioning position.

In witness whereof, I hereunto subscribe my name.

LESLIE S. GORDON.